Dec. 27, 1955   R. C. TILLINGHAST   2,728,287
BALE CAGE AND BALE HANDLING SYSTEM FOR COTTON COMPRESSES
Filed April 9, 1953   5 Sheets-Sheet 4
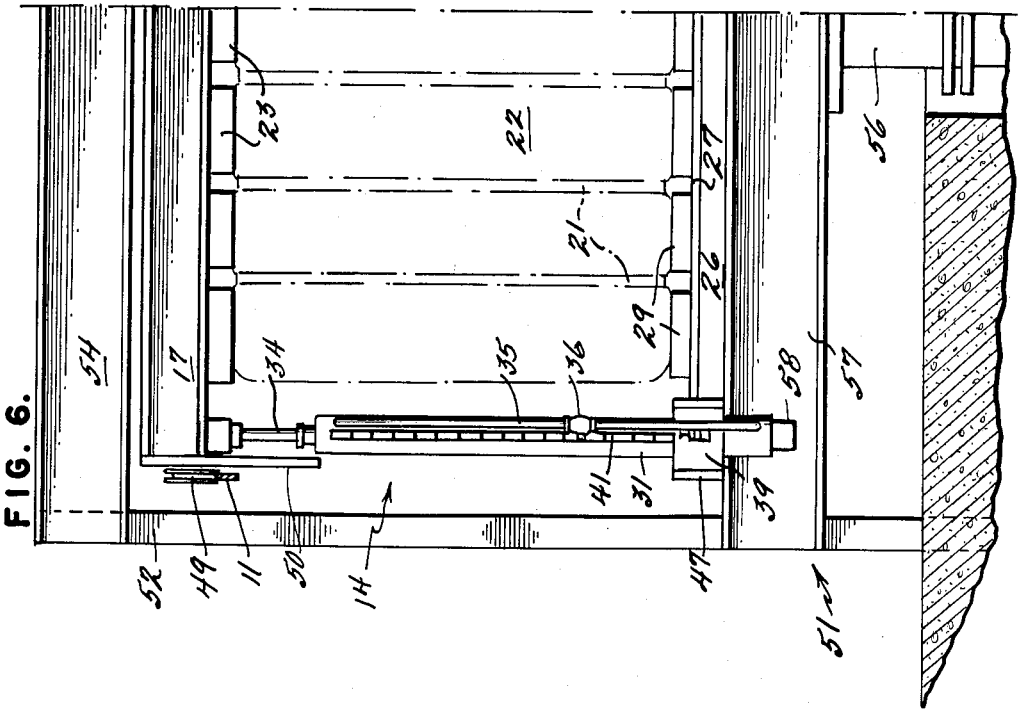
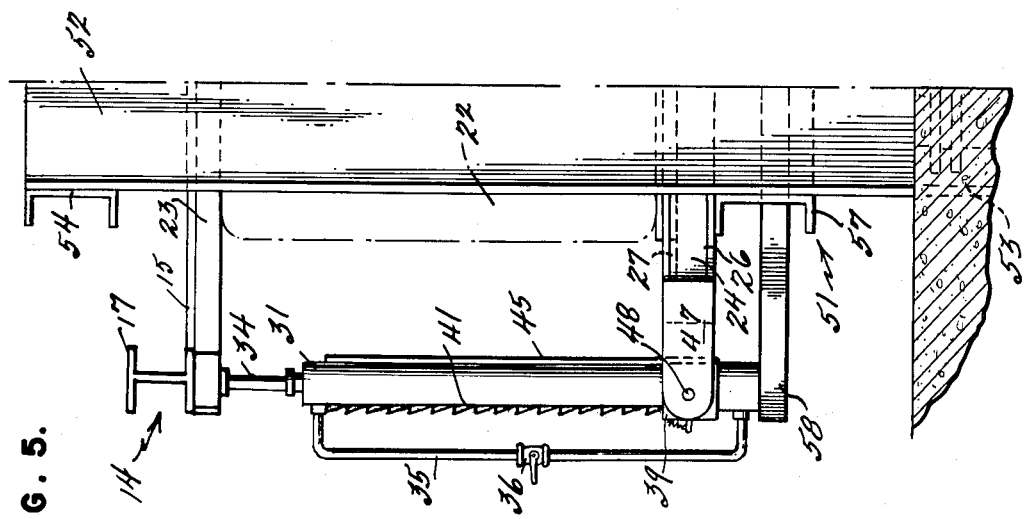
INVENTOR
RAY C. TILLINGHAST
BY
ATTORNEY Dec. 27, 1955 R. C. TILLINGHAST 2,728,287
BALE CAGE AND BALE HANDLING SYSTEM FOR COTTON COMPRESSES
Filed April 9, 1953 5 Sheets-Sheet 5
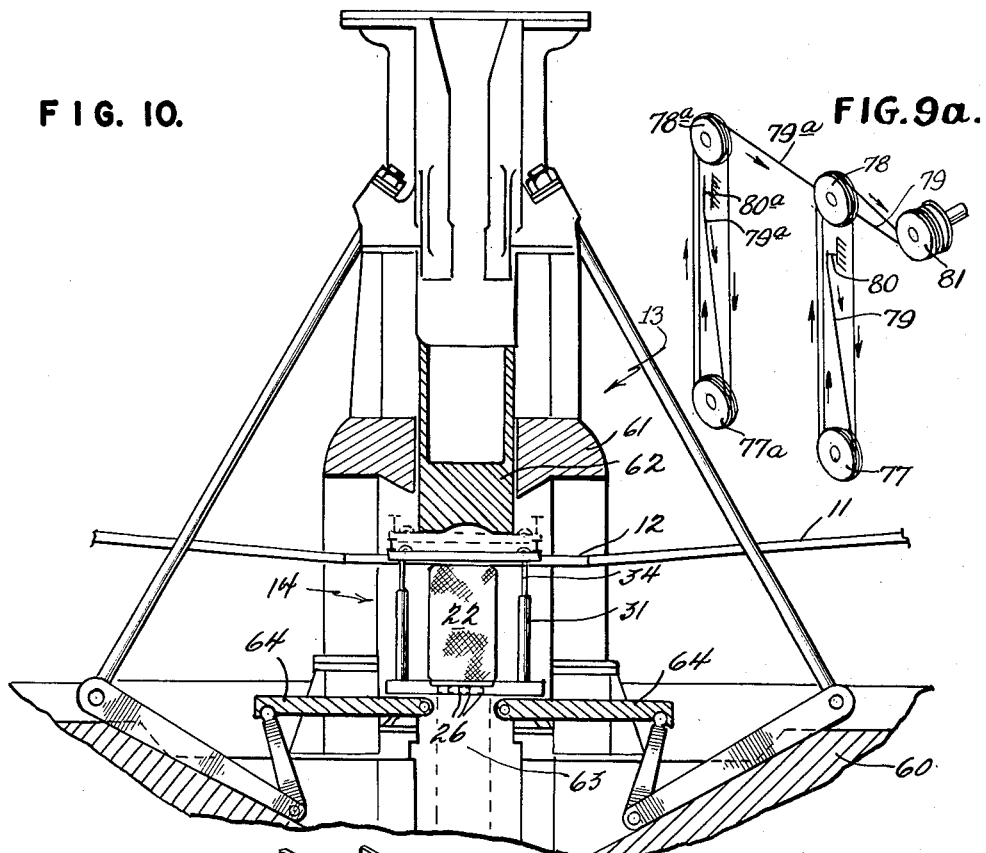
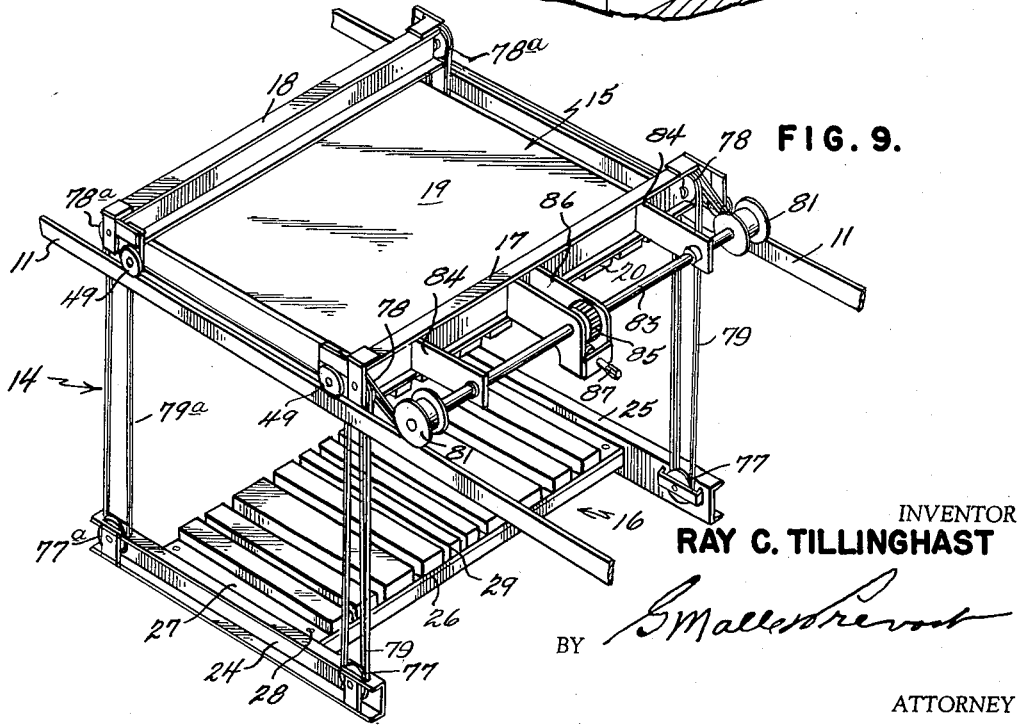
INVENTOR
RAY C. TILLINGHAST
BY
ATTORNEY United States Patent Office 2,728,287
Patented Dec. 27, 1955

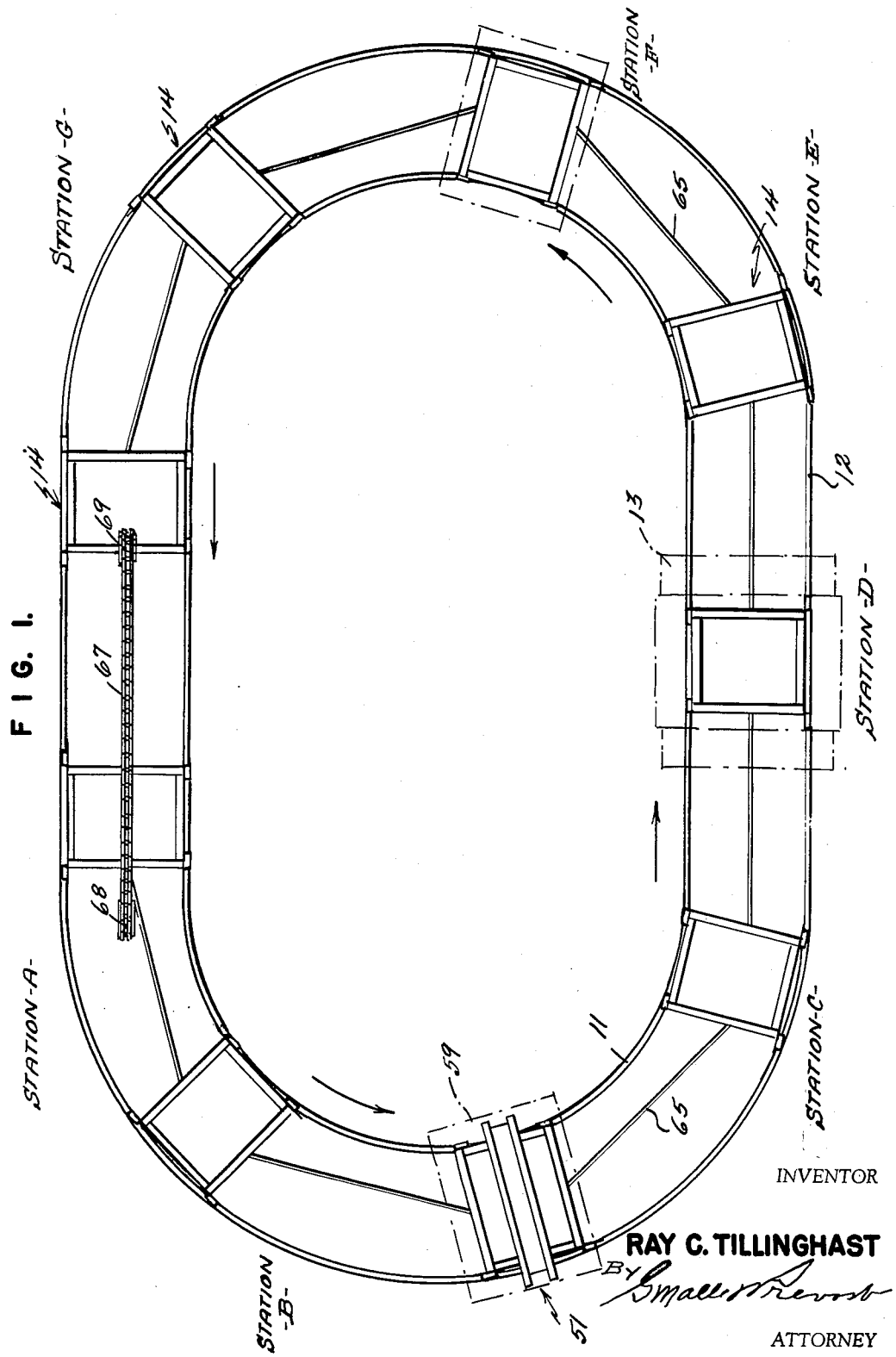

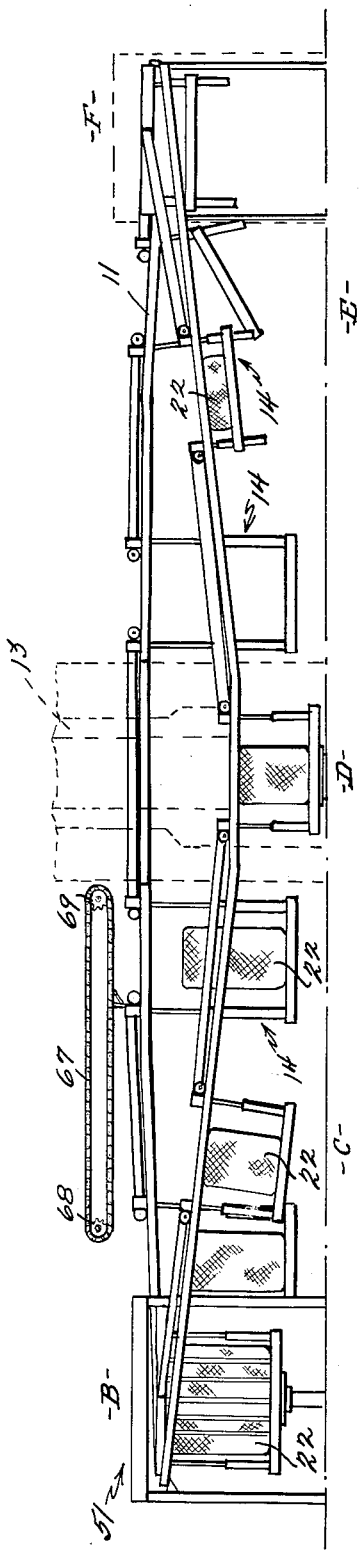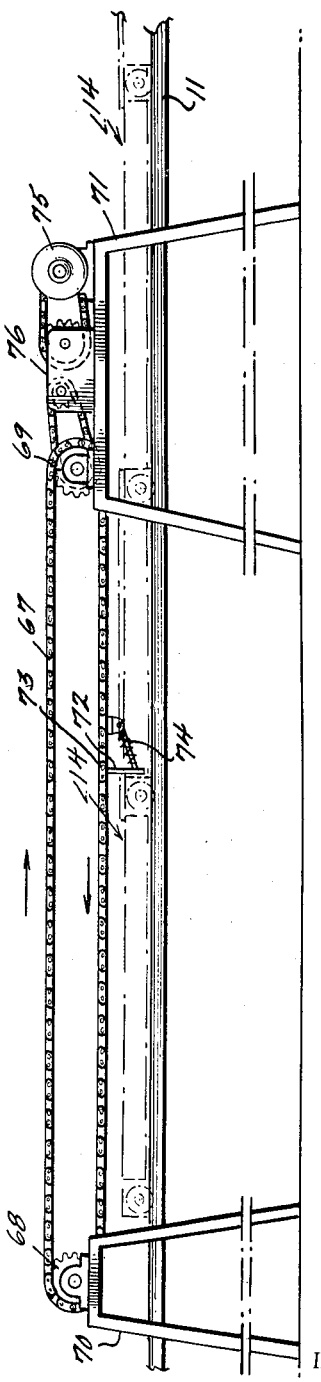

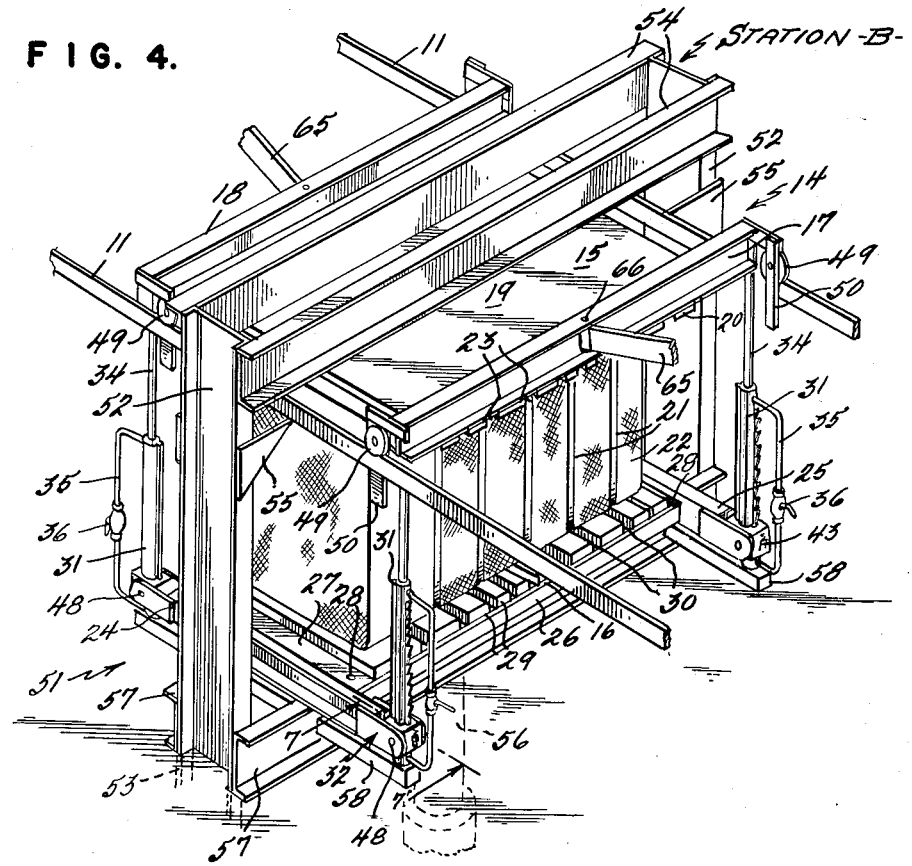

2,728,287

BALE CAGE AND BALE HANDLING SYSTEM FOR COTTON COMPRESSES

Ray C. Tillinghast, Memphis, Tenn.

Application April 9, 1953, Serial No. 347,800

10 Claims. (Cl. 100—219)

This invention relates to the art of compressing cotton bales and the like and consists more particularly in a compressing and handling system adapted to streamline the previously manual operations involved in the processing of a "flat" bale, from the time it is received from the gin until it is pressed either to standard density or high density for shipment. The purpose of the invention is to provide suitable mechanism whereby these operations may be conducted by assembly line methods.

In the processing of cotton bales there are two types of pressing operations required to meet different density specifications and which involve slightly different procedures.

One type of operation, employed mostly in the inland compresses, involves the compressing of the "flat" bale as it is received from the cotton gin and prepared for domestic shipment. These "flat" bales are roughly 28 inches thick by 45 inches wide by 56 inches long and they generally have a density of about 12 pounds per cubic foot. In this compressing operation the bale is compressed to a size of 31 inches thick by 22 inches wide by 56 inches long and the thus compressed bale is known in the art as a "standard density" bale, having a density of approximately 23 pounds per cubic foot.

As will later appear, it is sometimes necessary to further compress the "standard density" bale, to a "high density" size for export purposes, the "high density" bale being 22 inches thick by 21 inches wide by 57 inches long and having a density of approximately 32 pounds per cubic foot. This operation is usually performed in the concentration warehouses at the ports, although it is sometimes performed at the inland compresses. Furthermore, a bale may also be compressed from a "flat" bale, directly to a "high density" bale. Thus, in order to provide a universally adaptable mechanism for accomplishing the objects of this invention, the structure must be capable of performing both types of compressing.

The following brief description of the methods employed in compressing cotton bales, will facilitate a clear understanding of the present invention and I will first describe the procedure in compressing a "flat" bale to a "standard density" bale.

The flat bale is loaded either by a hand truck or a clamp truck, into a small pre-press, generally known as a "dinky," where it receives a slight compression sufficient to loosen the bands so that the buckles can be unhooked. Wire hooks are then engaged in the burlap bagging which covers the top and bottom of the bale when it leaves the gin, said bagging being secured on the bale by the use of six bands or ties which are applied at the gin. In compressing this bale in the "dinky" press the burlap bagging is permitted to remain on the bale but the six bands are removed as they will be too long after the bale is compressed to either standard density or high density and furthermore they are not properly spaced, eight bands being required to hold the finally compressed bale together.

The previously mentioned hooks hold the bale together after its removal from the dinky press, sufficiently for its trip into a conventional compress machine which for example, may be of the type known as a Webb press. The pressure on the dinky press, after the bands are unbuckled and the hooks inserted into the bagging, is released and the bale pushed out into a waiting hand truck where the bands are stripped off. A trucker then wheels the bale to the main press with the aid of the man who holds the loose bagging up out of entanglement with the wheels. The following crew of men is usually required at the main press: 4 reefers, 4 tiers, 2 head sewers, 1 lever man, and 1 hook man.

At the press the trucker dumps the bale onto the lower platen and the head sewers position it with the reefers assisting as necessary. The lever man starts the press which compresses the bale between the lower and upper platens and as this is taking place the tiers insert two ties apiece through the channels in the upper platen and the reefers return them through the channels in the bottom platen. The tiers then grab the two loose ends protruding on their side of the press and buckle them and while this is in process the head sewers wrap the bagging over the bale heads and sew it in place.

The lever man then releases the press and the reefers, with the aid of two bars, push the bale out of the press where it is hooked by the hook man with special hooks on the end of a cable from a gib crane. The crane drags the bale away from the press and sets it up against a rail or lays it on a trailer for hauling. Many of these operations are done simultaneously but it will be apparent that considerable time is bound to be lost in waiting between operations.

The other type of operation above referred to, is involved in compressing a standard density bale to a high density bale and the main difference in the two operations lies in the fact that due to the higher density of the standard bale, the dinky press has insufficient strength to compress the bale enough to loosen the bands thereon. The bands must either be cut or the buckles broken to remove them before compressing to high density.

In the high density compression, two heavy hinged doors known as "high density" doors, swing into position on either side of the bale, compressing it laterally to a thickness of 21 inches. While these doors hold the sides compressed, the lower platen of the press is brought up between them, compressing the bale to a width of 22 inches. The lower platen is maintained in its upward position while the doors are opened, exposing the bale so that the ties can be put on and buckled. After buckling, the lower platen is released and the bale pushed out, as with the standard density bales.

As the lower platen of the press must fit between the high density doors, the channel plate for high density pressing is narrower than the standard density channel plate, the latter being 32 inches wide to support the wide bale. As will later be described, the channel plates are removable castings equipped with slots for the bands to pass through, said castings being removably attached to the lower platen and manually interchangeable.

It is the primary object of the present invention to provide a bale conveyor and handling assembly for use in connection with presses of the Webb type, for example, and by means of which a bale is received from the dinky press and conducted through a series of stations designed to accomplish the operations above set forth in successive steps without removing the bale from the assembly line.

Another object of the invention is to provide in an assembly of this type, a bale-retaining cage adapted to hold the bale in compressed form from the time it leaves the dinky press until it is finally removed from the Webb press after being compressed either to standard density or high density and prepared for shipment.

A further object of the invention is to provide a bale cage and an endless conveyor track, so arranged with respect to the main press, that a bale can be conducted through the press for the compressing operation while still retained in the cage.

A still further object of the invention is to provide a bale cage structure having upper and lower platens adapted to register with and cooperate with the upper and lower platens respectively of a main press, the lower platen of the bale cage being shiftable toward the upper platen simultaneously with the operation of the press and including means for retaining the cage platens in compressing positions after the cage has left the press.

Another object of the invention resides in the provision of a series of bale cages adapted to travel around an endless track associated with a main press mechanism and including means for operatively connecting the cages so that they will travel simultaneously around the track to be successively presented to the dinky press, the compress machine and various other operating stations.

Still another object of the invention is to provide an advancing mechanism designed to intermittently move the series of connected cages around the trackway with intervening stop overs at the various operating stations.

At the present time, the various operations above referred to are conducted in the vicinity of the main press and generally only one operation at a time is possible. This not only creates a congested condition at the press, but is very wasteful of time.

It is therefore an important object of the present invention, to provide a system which decentralizes the operations so that they can be carried on simultaneously instead of in sequence at the press. In other words, while the main press is compressing one bale, other bales are being pre-pressed, hand stripped, and banded.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Figure 1 is a top plan view, diagrammatically illustrating my improved system and showing the locations of the various operating stations.

Figure 2 is a more or less diagrammatic view in side elevation, of the assembly shown in Fig. 1.

Figure 3 is a side elevational view of one form of mechanism for intermittently advancing the series of cages around the track way.

Figure 4 is an isometric view of one form of cage mechanism embodying a combined hydraulic and ratchet means for locking the cage platens in shifted relative positions, the particular location of the cage being illustrated in position in a dinky press.

Figure 5 is a fragmentary sectional view of one end of a bale cage, illustrating the locking mechanism.

Figure 6 is a fragmentary view of the same mechanism taken at right angles to Fig. 5.

Figure 7 is an enlarged sectional view taken on line 7—7 of Fig. 4 showing the hydraulic plunger and cylinder of the locking mechanism.

Figure 8 is a fragmentary detail of the lower platen hinge structure.

Figure 9 is an isometric view of a modified form of bale cage, embodying a cable and pulley arrangement for retaining the top and bottom platens in shifted relative positions, Figure 9a is a diagrammatic view showing the cable arrangement in the modified form of bale cage shown in Figure 9, and Figure 10 is a fragmentary sectional view through a main press of the Webb type, with the high density doors open and showing the relative position of the cage conducting trackway with respect to the press.

In the drawings, referring first to Figures 1 and 2, 11 represents a double, elevated trackway which is substantially oval in shape, one side of said track being gradually lowered as at 12, where it passes through the opening in the compression area between the platens of the main press shown in dotted lines at 13, the remainder of the oval trackway being elevated to provide proper clearance with respect to the press room floor, in which it forms a closed circuit.

As will be seen from Figure 1, a series of operating stations are located at predetermined points around the oval trackway, each station representing a point where an operation, necessary to the compressing of a bale of cotton, is preformed. These stations are as follows: A, the cage loading station; B, the pre-press or band slacking and band stripping station; C, a spare cage station; D, the main pressing station; E, another spare cage station; F, a banding and buckling station; and G, an unloading station where the cages are emptied and adjusted to receive new bales being fed into the circuit.

The preferred form of bale cage for conducting the bales around the trackway 11 and through the various stations, is shown in Figure 4 which also illustrates the relationship of the cage with respect to the dinky press or band-slacking station B where the first operation takes place. Here it will be seen that bale cage, generally indicated by the numeral 14, consists of upper and lower platens 15 and 16 respectively. Both platens are constructed of structural steel designed with strength sufficient to withstand the expanding pressure of a compressed bale, without restraining ties, after the press has been released.

The upper platen 15 consists of two transversely extending, parallel I-beams 17 and 18, spaced apart with a steel plate 19 welded between their lower flanges. On the bottom side of the I-beams 17, 18 and plate 19 are welded a plurality of bale-engaging bars 20 which extend longitudinally of the top platen 15 and are laterally spaced from one another to form a predetermined number of slots or grooves 23 to accommodate the bands 21 surrounding the bale of cotton 22. These slots 23 are arranged in number and spacing, to accommodate any given number of cotton restraining bands. The lower platen 16 consists of two transversely spaced, parallel channel irons 24 and 25, extending longitudinally on opposite sides of the cage and connected by a series of transversely extending parallel cross channels 26, welded therebetween in spaced relation. These cross channels are spaced so that collectively they will fit between the high density doors of the main press when in closed position, as will later appear.

A steel plate 27 is removably mounted on top of the cross channels 26, by bolts or other suitable means 28 and on top of the plate 27 are welded a series of filler bars 29, extending longitudinally of the platen 16 and transversely spaced to coincide with the spacing of the upper filler bars 20 so as to accommodate the bale-restraining bands. The spaces in the lower platen are indicated by the numeral 30.

The purpose of providing a removable plate 27 which supports the lower filler bars 29, is to permit the interchangeability of two different sized lower plates. The plate and filler bars for use in compressing a bale to standard density are considerably wider, longitudinally of the cage, so as to accommodate the wider standard bale, while the lower plates and filler bars for the high density operation must be sufficiently narrow to fit between the high density doors of the main press, as will be explained later. Otherwise, the construction of the two lower platens and their filler bars, is the same.

In the preferred form of bale cage shown in Fig. 4, the lower platen 16 is suspended from the upper platen 15 by four combination hydraulic-mechanical connections, one located at each of the four corners of the cage. Each of these combination connections consists of a closed cylinder 31, vertically reciprocable in a hinged block assembly generally indicated by the numeral 32 and carried by opposite ends of the I-beams 24—25. These hinge blocks will be described in more detail later on. As will be seen in Fig. 7, within each of the cylinders 31 is mounted a piston 33, secured to the end of a piston rod 34 which projects vertically through the upper end of the cylinder 31 and is connected at its upper extremity to the respective ends of the transverse I-beams 17 and 18. The connections at these points are preferably secured by welding.

The upper and lower areas of the cylinder 31, on opposite sides of the piston 33 are in communication by equalizing connections 35, provided with suitable control valves 36 and each piston is ported as at 37 and provided with a ball check valve 38. The ball check valve 38 is of the type which permits the flow of fluid from the lower end of the cylinder 31, past the ball valve, into the upper portion of the cylinder, but seats upon the application of pressure on the top side of the cylinder so as to prevent the reverse flow of fluid. Thus, upward movement of the cylinder 31 with respect to the fixed piston 33, is permitted while return movement of the cylinder can not occur until the valve 36 is opened to permit equalization of the pressures at opposite ends of the cylinder.

Turning now to the specific structure of the hinged blocks 32, it will be seen in Fig. 8 that each of these consists of a block member 39 provided with a vertical bore 40 within which the cylinder 31 is adapted to slide. On one side of each cylinder I provide a ratchet rib 41 which extends longitudinally of the cylinder and slides in a recess 42 located in the block 39. A pawl 43 is pivotally mounted in a suitable opening in the block 39 with its operative end extending into the recess 42 for engagement with the teeth of the ratchet 41, a spring 44, normally urging the pawl into operative engagement. The teeth of the ratchet and the relationship of the pawl are such as to permit relative upward movement of the block 39 with respect to the cylinder 31 but to be locked against downward relative movement unless the pawl is released.

On the opposite side of the cylinder 31 is a vertically extending rib 45 which slidably engages a guide groove 46 in the block 39 whereby the tube 31 is maintained in its proper relative position with respect to the block 39.

Each of he blocks 39 is secured to the respective end of the I-beams 24—25 by means of a pair of plates 47 welded to the edges of the I-beams and projecting beyond the ends thereof where they are hingedly connected as at 48 to the central portion of the respective blocks 39. The blocks are spaced a sufficient distance from the ends of the I-beams to permit this hinging movement, the purpose of which will be later described. However, due to the central location of the hinge point 48, a straight line vertical movement of the blocks 39 is permitted with respect to the cylinders 31 when the lower platen 16 is moved upwardly toward the upper platen 15.

The first compressing operation encountered in the cycle of my system, occurs at station B where the flat bale carried by the cage reaches the dinky press for the purpose of stripping the original retaining bands and in this operation it will be noted that only the hydraulic portion of the combination connections, enters into the operation. Figure 4 shows the bale cage 14 in position in the dinky press and here it will be seen that the bale cage is supported on the trackway 11 by means of four wheels or rollers 49 preferably fixed at the four corners of the upper platen of the cage on the respective ends of the I-beams 17 and 18. The mounting of each of the rollers 49 on the inside of the trackway 11 is provided with a downwardly extending guide 50 which permits a slight elevation of the entire cage off of the trackway during the compressing operation as will later appear, but will insure the return of the rollers to the tracks.

The dinky press is geenrally indicated by the numeral 51 and consists of two upright channels 52 suitably anchored at their lower ends as at 53 and connected at their upper ends by a pair of cross beams or frames 54 which are welded or otherwise secured to the uprights. Inwardly directed brackets 55 may be mounted on the uprights to lend vertical supports to the tracks 11.

The hydraulic ram of the dinky press is represented by the numeral 56 and suitably secured to the upper end of this ram are a pair of transversely extending I-beams 57, spaced apart to provide a sliding clearance with the edges of the uprights 52 so that as the ram 56 is elevated beneath the bottom platen of the cage, the cross channels 57 are elevated therewith and are guided in this movement by the edges of the uprights 52.

In order to adapt the dinky press to my improved system, a pair of bars 58 are extended across the channels 57 so that their opposite extremities lie in line for engagement with the lower ends of respective cylinders 31 as will be seen in Fig. 4. These bars 58 may be inserted through suitable openings in the webs of the channels 57 and welded in place so that as the channels are elevated the bars 58 positively engage the lower ends of the cylinders.

In the operation of the mechanism thus far described, the bale 22 is first placed on the lowered bottom platen 16 in flat form with the restraining bands 21 in place and it is desired to compress the bale to the extent necessary to release the bands 21. Hydraulic or steam pressure is applied to the ram 56 which causes the cross channels 57 to move upwardly, contacting the lower ends of respective cylinders 31. The continued upward movement of the ram and cross channels moves the cylinders 31 with respect to the fixed pistons 33 and, the pawsl 43 being locked in the ratchet teeth 41, the entire lower platen 16 is elevated against the upper platen 15 which is restrained against upward movement by the top cross channels 54 of the dinky press, the top platen having been slightly elevated and lifted from the track so that the top plate 19 engages directly under the cross channels 54. As before explained, this vertical movement of the cylinders 31 with respect to the fixed pistons, is permitted by the ball valve arrangement 37—38 which also prevents the return movement and release of compression on the bale, until the valves 36 are opened to equalize the pressure in the cylinders.

While the bale is in this pre-pressed condition the original bands 21 are removed either by hand or by a mechanical band-stripping mechanism shown diagrammatically in Fig. 1 at station B as at 59. This band stripper forms no part of the present invention and may be located at the dinky press or posterior thereto in the cycle of operation and after the bands are removed from the bale, the bale cage with the bale still compressed continues along the trackway 11 until it reaches the main compress machine located at station E and shown diagrammatically in Fig. 10.

The main compress machine is represented generally by the numeral 13 and comprises a main fixed head 61 having a top platen 62 and a lower, steam-operated platen 63. In this operation the bale is either compressed to standard density or to high density, the latter operation requiring the use of the high density doors 64 which when closed embrace the front and rear portions of the bale cage to confine the highly compressed bale within the required limits. This particular phase of the operation is conventional and need not be described in detail.

The operation of my invention at this point will be described in connection with the standard density compressing operation and as shown in Fig. 10 the high density doors are in open position as they do not enter into the operation. In the main compressing operation the cross bars 58 previously described in connection with the dinky press, are eliminated and the lower platen 63 of the main press, engages directly under the spaced cross channels 26 on the lower platen 16 so that the upward movement of the compress ram or platen 63, causes the lower platen 16 of the cage, to be elevated with respect to the cylinders 31. During this movement the hinged blocks 32 slide vertically on the respective cylinders 31 and are locked in their elevated positions by means of the pawl and ratchet mechanism 41—43. Simultaneous upward movement of the cylinders with respect to the pistons, may occur but this is of no importance at this point and the check valve mechanism 37—38 would come into play and further lock the mechanism.

As in the case of the dinky press operation, the entire cage is elevated from the tracks 11 during the actual compressing operation so that the top plate 19 of the top platen 15 engages directly under the top platen 62 of the main press. This position is shown in dotted lines in Fig. 10.

After the bale has been compressed to either standard density or high density as the case may be, it leaves the main compress machine and travels to station F where banding and buckling takes place, the bale being retained in its compressed condition by the locking connections between the upper and lower platens of the bale cage. This banding and buckling may be accomplished by hand or by mechanical means which again, forms no part of the present invention.

After the banding operation the bale is ready for discharge from the cage and at this point the purpose of the hinge block arrangement 32 becomes apparent. It is desirable to lower either one side or the other of the lower platen 16 after the main pressure has been released, so as to roll the bale out on to a waiting truck. After the bale has left the banding station the pressure in the cylinders 31 is equalized for a short period by opening the valves 36 to permit the lower platen 16 to drop slightly. Then in order to drop one side of the lower platen 16 the two adjacent pawls 43 on that side of the platen are tripped. Thus one side of the platen remains elevated and the tripped side is lowered by means of the four hinged connections 48 and the bale automatically rolls out of the cage.

The manner of conveying the series of bale cages around the oval trackway 11 will now be described. Each of the cages is connected to the preceding and succeeding cage by means of swivel connections 65 which may be in the form of rigid bars hingedly connected as at 66 to the respective cross channels 17 and 18 of the various cages 14 so that movement of one cage will cause simultaneous movement of all of the cages. While I have shown connecting bars for this purpose it will be understood that cables or other connecting means may be employed so long as some means is provided to accommodate the turn at each end of the oval trackway.

The actual drive mechanism may take various forms and in Figs. 2 and 3 I have shown one form which is adaptable for this purpose. The mechanism illustrated, consists of an endless chain 67 adapted to travel around a pair of spaced sprocket wheels 68 and 69 mounted on horizontal axles which are supported by a pair of frame members 70 and 71 which straddle the trackway 11, preferably on the side of the oval opposite the main compress machine and are sufficiently elevated to dispose the endless chain 67 in a plane slightly above the cages traveling along the trackway. At one point on the chain 67 I provide a pusher rod 72 which is hingedly connected to one of the links of the chain as at 73 and is prevented from rearward movement by an abutment 74. As the chain 67 travels around the sprockets 68 and 69 this pusher rod engages behind one of the cross channels 17—18 and moves the cage along the trackway.

Power for operating the chain is furnished by a motor 75 through a suitable belt connection to a constant speed shaft of a variable speed unit 76 which in turn is connected by a belt to the sprocket 69. The length of the chain 67 is such that the rod 72 will advance the cages only one station at a time and the motor 75 is controlled by a timing device which is set to provide the proper length of time for the conveyor to move and to be at rest. The abutment 74 may be provided with any suitable overload protection mechanism as diagrammatically shown in Figure 3, in case a cage is held up at one of the stations.

In Fig. 9 I have shown a modified form of bale cage which is basically the same as that shown and described in connection with Fig. 4 and corresponding elements are indicated by the same reference numerals in the two figures. However, in the Fig. 9 form, the combination hydraulic-mechanical connecting means between the upper and lower platens of the cage, are replaced by a cable arrangement and ratchet controlled locking means.

Opposite ends of the lower platen channel irons 24—25 and the corresponding ends of the upper platen channel irons 17—18 are provided with complementary sheaves. As seen in Figures 9 and 9a, the channel irons 24—25 are provided at their forward ends with double sheaves 77 and at their rear ends with similar double sheaves 77a, said sheaves being rotatably supported on horizontal axes, by any suitable means. Similarly, the corresponding ends of the upper channel irons 17—18, carry complemetary double sheaves, with sheaves 78 located immediately above and in line with lower sheaves 77 and sheaves 78a located above lower sheaves 77a. On each side of the cage a pair of separate cables 79 and 79a, preferably in the form of wire rope, are placed over the complementary sets of sheaves 77—78 and 77a—78a, one end of each cable being anchored to a fixed point adjacent the upper platen, with the opposite ends of each pair wound on a drum 81. Two drums 81 are coaxially mounted on a common shaft 83, rotatably supported in brackets 84, fixed to the cross channel 17 and projecting forwardly of the bale cage, one drum for each of the sets of cables 79—79a, on opposite sides of the cage. Intermediate the ends of the shaft 83 I provide a worm and wheel mechanism 85, supported with the central portion of the shaft, by means of a bracket arrangement 86 fixed to the cross channel 17. A stem 87 projects from the bracket 86 and is connected to the worm of the worm and wheel mechanism 85.

Figure 9a illustrates the arrangement of the cables on their respective sheaves. Here it will be seen that forward cable 79 is anchored at 80 and passes downwardly clockwise over the outer groove of lower sheave 77, then up and clockwise over the outer groove of the upper sheave 78, then down and clockwise around the inner groove of sheave 77, up and clockwise over the inner groove of sheave 78, then forwardly and counter-clockwise around the drum 81. In a like manner, the rear cable 79a is anchored at 80a and passes downwardly and clockwise around the outer groove of double sheave 77a, upwardly and clockwise over the outer groove of upper sheave 78a, downwardly and clockwise around the inner groove of sheave 77a, upwardly and clockwise around the inner groove of upper sheave 78a, then forwardly and counter-clockwise around the same drum 81.

Thus, in order to take up slack in the cables 79 and 79a as the lower platen 16 is elevated toward the upper platen 15, during the compression of the bale, a standard torque type wrench such as employed in electric screw drivers or nut runners is engaged to the projecting end 87 of the worm shaft to turn it as the slack in the cable permits. When the press is released the resulting expansion pressure of the bale is held by the worm and worm wheel mechanism 85.

In a complete cycle of operation and employing a bale cage of the preferred form such as shown in Fig. 4, flat bales from the gin are loaded at station A into the waiting bale cage 14, the motor 75 having been set into operation and being time-controlled to regulate the duration of movement and rest periods. The bale proceeds to station B where it enters the dinky press 51 and stops. The ram 56 of the dinky press is elevated, causing the lower platen of the bale cage to compress the bale 22 between the two platens of the bale cage sufficient to release the tension on the bands 21. The combination hydraulic-mechanical locking means connecting the two bale cage platens, retains this compressed relationship after the dinky press ram has been lowered and the cage automatically progresses to station C where it waits its turn to enter the main compress 13 at station D. In the main compress machine the bale cage platens are further compressed with the bale therebetween, the bands having been removed at or subsequent to station B. In the main compress machine the bale is compressed to either standard or high density as desired and upon release of the lower ram 63 of the main compress, the bale proceeds to the spare station E to await the banding and buckling operation at station F. In the latter station bands are applied and buckled and the bale cage proceeds to station G for unloading.

As before explained, the unloading operation with the preferred form of cage simply requires a slight equalization of pressure in the cylinders 31 and then a final lowering of one side of the cage lower platen 16 to roll out the bale which is received by a waiting truck.

It will be understood that during the main compressing operation at station D, various other bales in their respective cages are being conditioned for final compression while others are being unloaded after compressing and banding. Thus I have provided an extremely simplified and streamlined operation for processing cotton bales from the time they leave the cotton gin until they are finally compressed and banded for shipment. By means of my improved mechanism comprising the bale cage described, the bale is retained in progressively compressed condition throughout the entire operation which greatly facilitates the removal of the original flat bale bands and the application of the new bands for final compression.

From the foregoing it is believed that my invention may be readily understood by those skilled in the art, without further description, it being borne in mind that numerous changes may be made in the details disclosed, without departing from the spirit of the invention as set forth in the following claims.

What I claim is:

1. In a bale handling system including a press mechanism having a stationary head, a power-operated lower ram movable toward said head, and an unbroken trackway traversing said press mechanism in a plane lying between those of said head and ram; a bale cage, comprising upper and lower platens, connecting means suspending the lower platen from the upper platen, said connecting means being retractible upon vertical movement of said lower platen toward the upper platen, means on said upper platen supporting said cage for horizontal travel around said trackway, said lastnamed means being vertically movable from said trackway, to permit the bodily lifting of said cage under the force of said ram, when the cage is in a position between said press head and ram, locking means associated with said connections for progressively retaining them in retracted condition, and guides for returning said cage supporting means to said trackway upon release of the ram pressure.

2. In a bale handling system including a press mechanism having a stationary head, a power-operated lower ram movable toward said head, and an unbroken trackway traversing said press mechanism in a plane lying between those of said head and ram; a series of bale cages, each comprising upper and lower platens, connecting means suspending the respective lower platens from the upper platens, said connecting means being retractible upon vertical movement of said lower platens toward the upper platens, means on said upper platens supporting respective cages for horizontal travel around said trackway, said lastnamed means being vertically movable from said trackway, to permit the bodily lifting of individual cages under the force of said ram, when respective cages are in a position between said press head and ram, locking means associated with said connections for progressively retaining them in retracted condition, guides for returning respective cage-supporting means to said trackway upon release of the ram pressure, and means operatively connecting said cages to form a closed circuit.

3. Apparatus as claimed in claim 2, including means for intermittently advancing said cages to successively present individual cages to said press mechanism.

4. In a bale handling system including a press mechanism having a stationary head, a power-operated lower ram movable toward said head, and an unbroken elevated trackway traversing said press mechanism in a plane lying between those of said head and ram; a bale cage, comprising upper and lower platens, connecting means adjacent corresponding corners of said platens, suspending the lower platen from the upper platen, said connecting means being retractible upon vertical movement of said lower platen toward the upper platen, rollers on said upper platen supporting said cage for horizontal travel around said trackway, said rollers being vertically movable from said trackway, to permit the bodily lifting of said cage under the force of said ram, when the cage is in a position between said press head and ram, locking means associated with said connections, for progressively retaining them in retracted condition, and guides for returning said rollers to said trackway upon release of the ram pressure.

5. Apparatus as claimed in claim 4, wherein each of said connecting means comprises a hydraulic cylinder mounted on said lower platen and vertically movable therewith, a piston in said cylinder having a fixed piston rod, connected to said upper platen, an equalizing fluid line connecting the upper and lower ends of said cylinder on opposite sides of said piston, a control valve in said line, and a check valve in said piston permitting one way passage of fluid from the lower to the upper end of said cylinder.

6. Apparatus as claimed in claim 5, wherein each of said cylinders is mounted for vertical sliding movement in said lower platen, and pawl and ratchet mechanism for locking said lower platen in progressively elevated position on said cylinders.

7. Apparatus as claimed in claim 4, wherein said connecting means comprise cable and pulley systems operatively connecting said platens for movement toward and away from one another.

8. Apparatus as claimed in claim 4, including selectively releasable locking means, and hinge means associated with said connections to enable the dropping of one side of said lower platen while the other side remains elevated, for unloading a bale therefrom.

9. A bale retaining and conveying cage comprising upper and lower platens, each consisting of a substantially rectangular frame member, metal plates supported horizontally thereby, said plates being directly engageable between the head and ram of a press, connections suspending the lower platen from the upper platen, said connections being retractible upon vertical movement of the lower platen toward the upper platen, under the force of said ram, selectively releasable locking means associated with said connections for progressively retaining them in retracted condition, means on said upper platen for movably supporting said cage on a trackway, and hinged means associated with said connections to enable the dropping of one side of said lower platen while the other side remains elevated, for unloading a bale therefrom.

10. A bale retaining and conveying cage as claimed in claim 9, wherein each of said connecting means comprises a hydraulic cylinder mounted on said lower platen and vertically movable therewith, a piston in said cylinder having a fixed piston rod, connected to said upper platen, an equalizing fluid line connecting the upper and lower ends of said cylinder on opposite sides of said piston, a control valve in said line, and a check valve in said piston permitting one way passage of fluid from the lower to the upper end of said cylinder.

References Cited in the file of this patent

UNITED STATES PATENTS

| | | |
|---|---|---|
| 6,175 | Johnson | Mar. 13, 1849 |
| 81,745 | Brown et al. | Sept. 1, 1868 |
| 137,160 | Weldon | Mar. 25, 1873 |
| 257,454 | Alexander | May 9, 1882 |
| 876,553 | Hutton et al. | Jan. 14, 1908 |
| 1,372,898 | Nelson et al. | Mar. 29, 1921 |
| 2,019,820 | Jones | Nov. 5, 1935 |